US 6,223,155 B1

(12) United States Patent
Bayya

(10) Patent No.: US 6,223,155 B1
(45) Date of Patent: Apr. 24, 2001

(54) METHOD OF INDEPENDENTLY CREATING AND USING A GARBAGE MODEL FOR IMPROVED REJECTION IN A LIMITED-TRAINING SPEAKER-DEPENDENT SPEECH RECOGNITION SYSTEM

(75) Inventor: Aruna Bayya, Irvine, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/134,177

(22) Filed: Aug. 14, 1998

(51) Int. Cl.[7] .................................................. G10L 15/06
(52) U.S. Cl. ............................................ 704/243; 704/256
(58) Field of Search ................................ 704/243–245, 704/256; 379/88.03

(56) References Cited

U.S. PATENT DOCUMENTS

| | | | |
|---|---|---|---|
| 5,583,920 | * 12/1996 | Wheeler, Jr. ........................ | 370/88.01 |
| 5,778,340 | * 7/1998 | Hattori ................................ | 704/244 |
| 5,842,165 | * 11/1998 | Raman et al. ...................... | 704/255 |

OTHER PUBLICATIONS

Bayya, A., "Rejection in Speech Recognition Systems with Limited Training," Proc. Fifth Int. Conf. on Spoken Language Processing ICSLP'98, Nov. 30–Dec. 4 1998, Sydney, Australia, vol. 2, pp. 305–308.*

Jay G. Wilpon, Lawrence R. Rabiner, Chin–Hui Lee and E.R. Goldman, "Automatic Recognition of Keywords in Unconstrained Speech Using Hidden Markov Models", *IEEE Transactions on Acoustics, Speech and Signal Processing*, nol. 38, No., 11, Nov. 1990, pp. 1870–1878.

Vijay Raman and Vidhya Ramanujam, "Robustness Issues and Solutions in Speech Recognition Based Telephony Services", *IEEE*, 1997, pp. 1523–1526.

Richard C. Rose and Douglas B. Paul, "A Hidden Markov Model Based Keyword Recognition System," Paper #S2.24, IEEE, 1990, pp. 129–132.

* cited by examiner

*Primary Examiner*—David Hudspeth
*Assistant Examiner*—Donald L. Storm
(74) *Attorney, Agent, or Firm*—Akin, Gump, Strauss, Hauer & Feld, L.L.P.

(57) ABSTRACT

A speaker-dependent (SD) speech recognition system. The invention is specifically tailored to operate with very little training data, and also within hardware constraints such as limited memory and processing resources. A garbage model and a vocabulary model are generated and are subsequently used to perform comparison to a speech signal to decide if the speech signal is a specific vocabulary word. A word score is generated, and it is compared to a number of parameters, including an absolute threshold and another word score. Off-line training of the system is performed, in one embodiment, using compressed training tokens. A speech signal is segmented into scramble frames wherein the scramble frames have certain characteristics. For example, length is one characteristic of the scramble frames, each scramble frame having a length of an average vowel sound, or a predetermined length of nominally 40–50 msec. The invention is operable to be trained using as little as one single training token that is segmented. Those segments may be re-arranged to form a pseudo-token to form a garbage model. The use of a pseudo-token allows for generation of a reliable garbage model having many speaker-specific characteristics of an original training token while discarding the specific acoustic characteristics of any vocabulary word corresponding to the training token. The invention is equally as operable by using a training token to form a vocabulary model having multiple states, and re-arranging those states to form one or more garbage models.

18 Claims, 8 Drawing Sheets

CREATING TRAINING SPEECH FOR GARBAGE MODEL

Rejection using garbage model(s)

SD SPEECH RECOGNITION SYSTEM TRAINING (NON-REAL TIME)

SD SPEECH RECOGNITION (REAL TIME)

$a_{ii}$  indicates the transition probability from state 'i' to the same state
$a_{ij}$  indicates the transition probability from state 'i' to the state 'j'
$b_i$  indicates the probability speech produced by state 'i'

METHOD OF INDEPENDENTLY CREATING AND USING A GARBAGE MODEL FOR IMPROVED REJECTION IN A LIMITED-TRAINING SPEAKER-DEPENDENT SPEECH RECOGNITION SYSTEM

BACKGROUND OF THE INVENTION

1. Field of the Invention

The invention relates generally to speech recognition systems, and more particularly to an improved method of developing and employing a garbage model in a speaker-dependent speech recognition system having limited resources such as a cellular telephone.

2. Description of Related Art

The user interfaces of many electronic systems now involve speech recognition technology. There are two general types of speech recognition systems: (1) "speaker independent" (SI) systems; and (2) "speaker dependent" (SD) systems. Some phone companies, for example, have used SI speech recognition technology to create directory assistance mechanisms whereby any user may say the name of the city for which directory assistance is desired. Likewise, some cellular telephones feature SD speech recognition technology so that a particular user may "train" the phone to recognize "call home" and then automatically dial the appropriate number.

Unlike SI systems, SD systems require training. SD systems, however, are normally hampered by having only limited training data because the user of such systems would find it annoying to provide extensive training data. Moreover, SD systems are often used in a portable device, such as a cellular phone, which tend to have severely limited resources in terms of memory and/or computing power because they are necessarily designed within certain size, memory, cost and power constraints. The solutions suitable for implementation in an SI system, therefore, are not generally applicable to an SD system having limited training data, particularly where such SD system is used in a portable device, such as a cellular phone, having limited resources.

All speech recognition systems generally attempt to match an incoming "utterance" with one of a plurality of predetermined "vocabulary" words. In a typical implementation, the acoustic utterance is converted to a digital token, analyzed or decomposed in terms of characteristic "features," and then simultaneously compared, feature-by-feature, with one or more word models that each represent a vocabulary word.

FIG. 1, for example, shows a simplified network 20 that assigns an input utterance to one of N predetermined vocabulary words WORD_1 to WORD_N by finding the best match between certain "features" 200 of the input utterance and one of a plurality of "word models" 20-1 to 20-N. The FIG. 1 system, however, is subject to "mismatches" and "false acceptances":

Mismatch an utterance corresponding to one vocabulary word mistakenly matched with another vocabulary word

False Acceptance an utterance corresponding to a non-vocabulary word matched with a vocabulary word; or a non-vocabulary sound such as a lip smack or a cough matched with a vocabulary word.

Most speech recognition systems use some sort of "rejection" scheme to reject certain utterances and sounds that are likely to result in a mismatch or a false acceptance. Rejection of mismatches is desirable because it allows the system to gracefully prompt the user for more spoken input. Rejecting out-of-vocabulary words and non-speech sounds is always desirable because it reduces the rate of false acceptances. Rejection, however, also creates a byproduct called "false rejection":

False Rejection a rejection of an utterance corresponding to a vocabulary word A false rejection is a double-edged sword (could be good, could be bad) depending on what would have occurred in the absence of the false rejection. On the one hand, a false rejection improves recognition accuracy if the vocabulary word would have been mistakenly matched with another vocabulary word anyway ("putative error"). On the other hand, a false rejection degrades performance and annoys the user if the vocabulary word would have been correctly matched in the absence of rejection.

The rejection system should, therefore, maximize the rejection of both out-of-vocabulary words and non-vocabulary sounds, but only reject in-vocabulary words which are putative errors.

The most common rejection models applied in the speech recognition systems are as follows:

1. Parallel Garbage Models

The first and most common approach to rejecting of out-of-vocabulary words and sounds is including an explicit, parallel "garbage" model that represents all such words and sounds. An SI system necessarily uses "generic" garbage models that were developed with a plurality of different speakers. In some cases, nonetheless, a single garbage model is derived from many samples of out-of-vocabulary words, non-speech sounds such as clicks & pops, and samples from background noise/silence signals. Rejection or acceptance of a spoken utterance is determined by measuring the closeness of the utterance to the garbage model.

In other cases, one or more garbage models are used to represent different varieties of non-vocabulary words and sounds. For example, one garbage model may represent the background noise/silence; another may represent coughs, lip smacks, clicks & pops; and yet another may represent out-of-vocabulary words/phrases. The decision process may also vary from system to system. The decision of rejecting a spoken utterance or accepting it as one of the vocabulary words, for example, may be made by comparing the vocabulary model scores to each of the garbage model scores (or to the average score of all the garbage models).

FIG. 2 shows a simplified network 20' that is similar to FIG. 1, but which includes a parallel garbage model network 30 of "K" garbage models 30-1 to 30-K. Each garbage model 30-1 to 30-K operates in the same basic way as a vocabulary model 20-1 to 20-N, but the utterances that match the garbage models 30-1 to 30-K correspond to those words and sounds that are to be rejected. The user of any give system, of course, is generally expected to limit his utterances to in-vocabulary words. Accordingly, for any given utterance, it is more likely that the user's utterance is an in-vocabulary word as opposed to an out-of-vocabulary word. To reduce false rejections, therefore, the average score of the garbage models 30-1 to 30-K are often subjected to a "penalty," as shown in FIG. 2, before being compared with each of the scores from the word models 20-1 to 20-N to determine the selected word 210.

2. Absolute Threshold Model

FIG. 3 relates to another rejection approach that is used in both SI and SD systems. It is known as the "absolute threshold model." The threshold approach to rejection does not use a parallel network of garbage models, but rather relies on a threshold 302 developed with advance knowledge of the system's score distribution 300 for out-of-vocabulary words/sounds on the one hand and the system's score distribution 304 for in-vocabulary words on the other.

FIG. 3, in particular, shows two smoothed histograms or histogram envelopes 300, 304 related to a hypothetical SI speech recognition system. The leftmost envelope 300 shows the distribution of tokens versus word score for words or sounds that are not part of the vocabulary, i.e. words or sounds that are garbage. The rightmost envelope 304 shows the distribution of tokens versus word score for in-vocabulary words. The shape of the envelopes 300, 304 may vary because of random variations in inflection, background noise, and so on. The user, in other words, may speak a vocabulary word and receive a score that is higher or lower than the average peak score. In addition, the system may similarly react to garbage with a range of scores.

Notwithstanding the width or spread of the histogram envelopes 300, 304, an over-threshold word score may reliably indicate that the token is an in-vocabulary word provided, of course, that the envelopes 300, 304 have little or no overlap (ideal). The system simply deems tokens with a word score above the threshold 302 as part of the vocabulary and deems tokens with a word score below the threshold 302 as garbage. So long as the histogram envelopes 300, 304 do not overlap too much, an absolute threshold 302 will effectively reject garbage from vocabulary without rejecting too many in-vocabulary words (i.e. without imposing too many false rejections).

3. Confidence Measure Model

A third approach to rejection is the development and use of a "confidence measure." This approach might be viewed as an extension of the absolute threshold rejection illustrated by FIG. 3 in that the confidence measure is a dynamic threshold that changes for each candidate token. In this method, the confidence measure is obtained from the set of scores generated by each word model (e.g. 20-1 to 20-N of FIG. 1). To measure the level of confidence associated with each set of scores, the scores for all the word models 20-1 to 20-N are arranged in descending order with the best (highest) score at the top of the list. A confidence measure is then derived from the list and applied to select or not select the word model having the top score. A simple-minded confidence score, for example, is:

$$cm = \frac{1}{S_1}\left(S_1 - \frac{1}{(K-1)}\sum_{i=2}^{K} S_i\right)$$

where $S_1$ is the highest or best score and $S_2 \ldots S_K$ are the next K best scores. Then, all the spoken utterances with cm<x% are rejected where x is user-defined number. The effective use of a confidence measure, in other words, requires that the best score from a vocabulary model be significantly better than the average of the next K best scores before a selection is made.

Inapplicability of SI Rejection Approaches to SD Systems

The above rejection approaches have been shown to be effective in speaker-independent (SI) recognition systems, but are not very effective in speaker-dependent (SD) recognition systems, when applied independently, for the following reasons:

1. Problems with Garbage Models

The generic garbage models developed for SI systems are not effective as speaker-specific garbage models because the vocabulary models in the typical SD system are weak at the same time that the generic garbage models lack the specific voice characteristics of the user who trained the SD system. A garbage model is far more effective if the person who will use the system provides the training data for creating the garbage model. Creating a speaker-specific garbage model in an SD system is troublesome, however, because of the need for additional non-vocabulary speech samples beyond the often, once spoken, vocabulary words.

2. Problems with Absolute Thresholds

The absolute threshold approach is not well suited for a portable, limited resource, SD system because knowledge of the score distributions is needed and the distributions are not available when the user begins to use the system. Even after they become available, the distributions will vary from user to user such that it is impossible to design a threshold selection criterion that is optimal for all users. Also, because an SD recognition system such as a cellular phone often builds its vocabulary models with a very limited training, the available vocabulary models are not as robust as they are in an SI system. An SD system with such limited vocabulary models will tend to assign higher scores to vocabulary than to garbage, but the envelopes 300, 304 are likely to be "wide" and to overlap one another so much that the system will, depending on where you establish the threshold, either let too much garbage through or reject too many in-vocabulary words. It is theoretically possible to reduce the degree of overlap by refining the vocabulary models in a SD system with many repetitions of each word or phrase. This is not practical solution in an SD system such as a cellular phone, however, because the users of such systems are unlikely to perform the needed repetition.

3. Problems with a Confidence Measure

Using confidence measures is slightly superior to absolute score thresholds, but the criterion is somewhat weak when the vocabulary models are created from only one repetition of the word. This is particularly true when the vocabulary contains similar sounding words or word sets. In such cases, the confidence level may always be low when scoring the confusable word sets and the system may impose high rejection rates on such words.

There remains a need, therefore, for a method of developing effective garbage models in an isolated word, SD speech recognition system and for a method of rejection based on such garbage models that is more suited to isolated word, SD speech recognition.

SUMMARY OF THE INVENTION

The present invention relates to a method of speech identification that requires only limited training data to form both a vocabulary model and a garbage model, and that may be beneficially deployed in a limited resource device, yet achieves accuracy that is normally associated only with systems having extensive training data and less severely limited resource constraints. The invention uniquely uses the same speech signals used to create a word model to also create a highly effective garbage model.

In a first embodiment, the invention accomplishes this result by segmenting the speech corresponding to a training token and then rearranging the segments of the training token to form a pseudo-token. The pseudo-token is then used to form a garbage model for the speech recognition system in much the same manner that the original token is used to form a word model. In this manner a virtually unlimited number of pseudo-tokens can be created and used to form a garbage model. Since the pseudo-token is formed from the training token corresponding to actual speaker-specific training word(s), it retains the same voice characteristics, tenor, inflection, harmonics, etc. of the original speech and, therefore, can be used to create an excellent speaker -specific garbage model.

In a second embodiment, the training token is segmented and used to form Hidden Markov Models. A hidden Markov Model portrays a word as a series of sequential states. It is a probabilistic speech model and each state has a probability assigned to it. The probability represented is that of a frame staying in a given state or passing on to the next state. In the second embodiment, the states are rearranged to form a new, modified Hidden Markov Models that may be used as a garbage model.

Both of these embodiments create highly effective garbage models whether the training tokens are provided in compressed or uncompressed form. As may be appreciated by one skilled in the art, this technique also beneficially enables the effective formation of a garbage model that can be processed off-line and with little storage requirement so that it may be used in a limited resource system where processing power and storage capability are limited In a first aspect, the invention may be regarded as a method of identifying speech comprising the steps of: receiving a training token corresponding to a vocabulary word; generating a vocabulary model based on the training token; modifying the training token to form a pseudo-token; generating a garbage model based on the pseudo-token; comparing a speech signal to be identified to the vocabulary model; comparing the speech signal to be identified to the garbage model; and deciding if the speech signal to be identified is the vocabulary word based on both of the comparing steps.

In a second aspect, the invention may be regarded as a method of identifying speech comprising the steps of: receiving a training token corresponding to a vocabulary word; generating a vocabulary model based on the training token; modifying the vocabulary model to form a garbage model; comparing a speech signal to be identified to the vocabulary model; comparing the speech signal to be identified to the garbage model; and deciding if the speech signal to be identified is the vocabulary word based on both of the comparing steps.

In a third aspect, the invention may be regarded as a method of creating a garbage model for a speaker dependent speech recognition systems comprising the steps of: segmenting a training token into a plurality of frames; rearranging the plurality of frames to form a pseudo-token; and using the pseudo-token to create a garbage model.

BRIEF DESCRIPTION OF THE DRAWINGS

The just summarized invention may be best understood with reference to the drawings.

DETAILED DESCRIPTION OF THE PREFERRED EMBODIMENTS

A speaker-dependent (SD) speech recognition system, as suggested by its very name, requires the user to train the system on every word in the vocabulary set. A complete SD speech recognition system, therefore, includes a training component and a recognition component.

In certain SD systems, such as might be used in a cellular phone, the available training data is severely limited. In a cellular phone, for example, it may be assumed that the user will state each vocabulary word only once. Several competing approaches have been proposed for SD speech recognition where the vocabulary words are developed with such limited data. The presently preferred approach is a statistical modeling approach known as Hidden Markov Modeling (HMM) because a Hidden Markov Model (HMM) or Source is shown to characterize the speech signal very well in the feature spaces that best represent the acoustic properties of speech.

Under the HMM approach, it is assumed that the speech signal can be characterized by a random process in the given feature space which, in the proposed system, is the spectral domain or space of cepstral vectors. The training process can be viewed as estimating all the parameters describing this random process for each word in the vocabulary and the recognition or matching process can be viewed as identifying which of these random processes is most likely to produce the test token. A probabilistic measure is used to determine this closeness or similarity.

Figure 1:
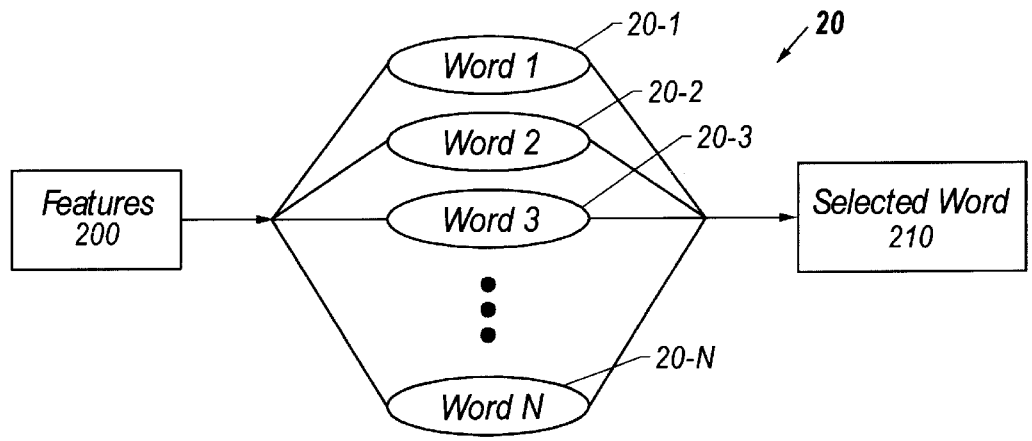
FIG. 1 is a simplified, prior art network 20 of vocabulary models 20-1 to 20-N (Word1, Word2, and so on) that each receive the features 200 of an input speech signal corresponding to an utterance and generate word scores that are analyzed in an appropriate manner to establish one of the vocabulary words as a selected word.
Figure 2:
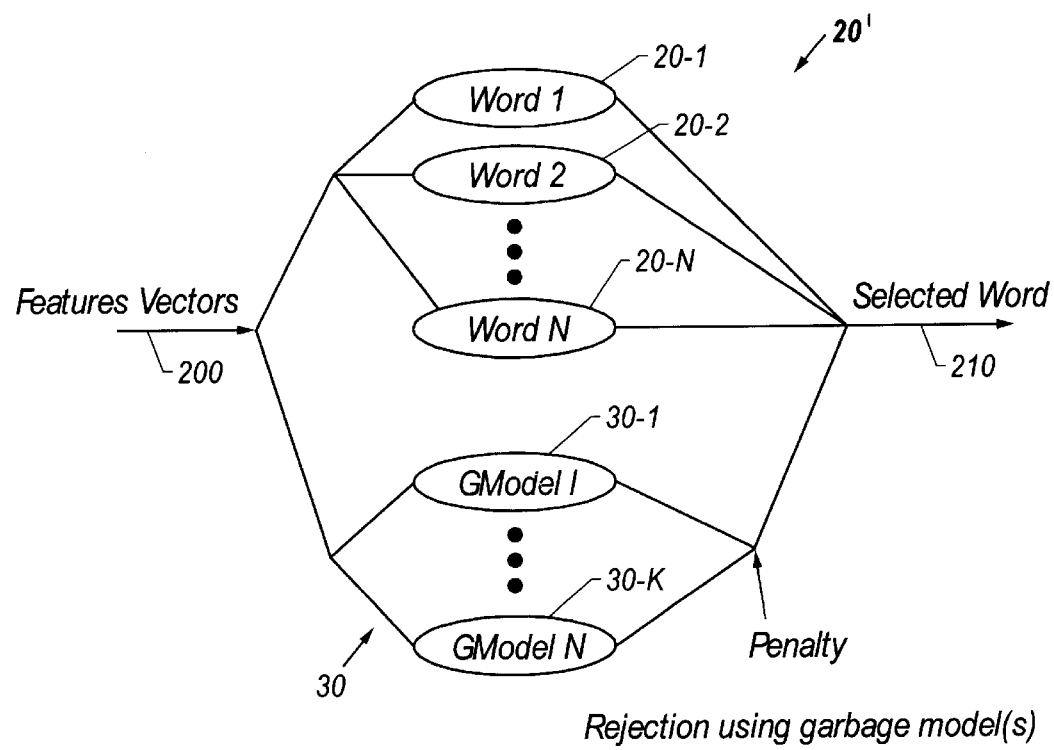
FIG. 2 is a simplified, prior art network 20 that is similar to FIG. 1, but further includes a plurality of garbage models 30-1 to 30-K that reduce "false acceptances" by rejecting out-of-vocabulary words and sounds.
Figure 3:
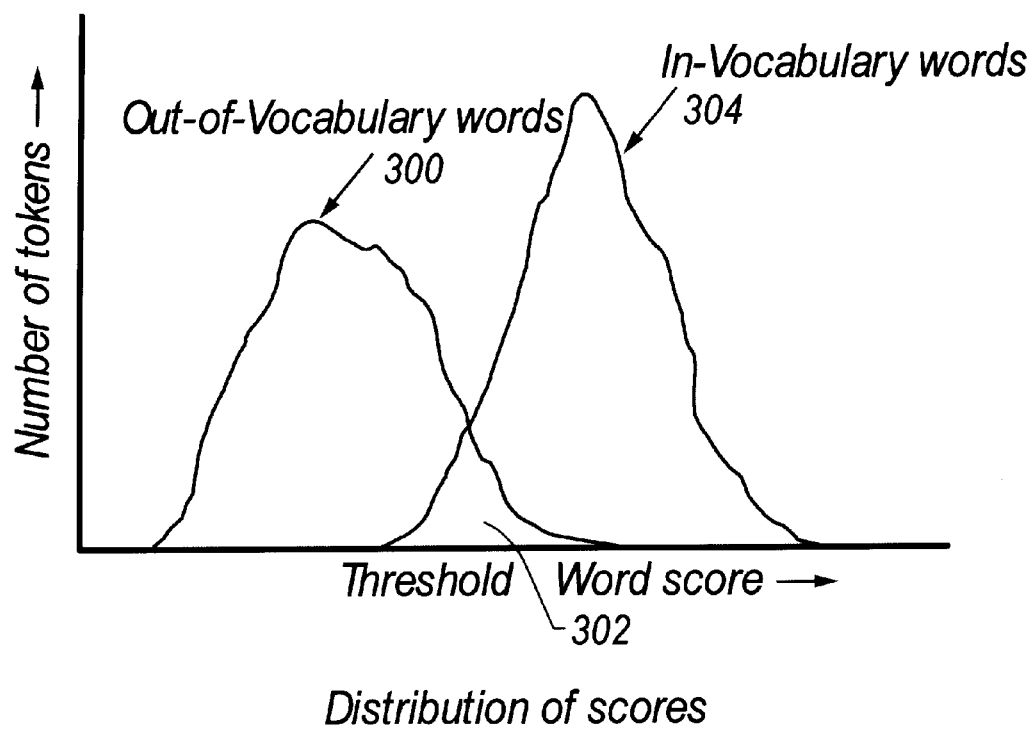
FIG. 3 shows smoothed histograms of the score distributions 300, 304 for garbage words and vocabulary words, respectively, in a hypothetical speech recognition system.
Figure 4:
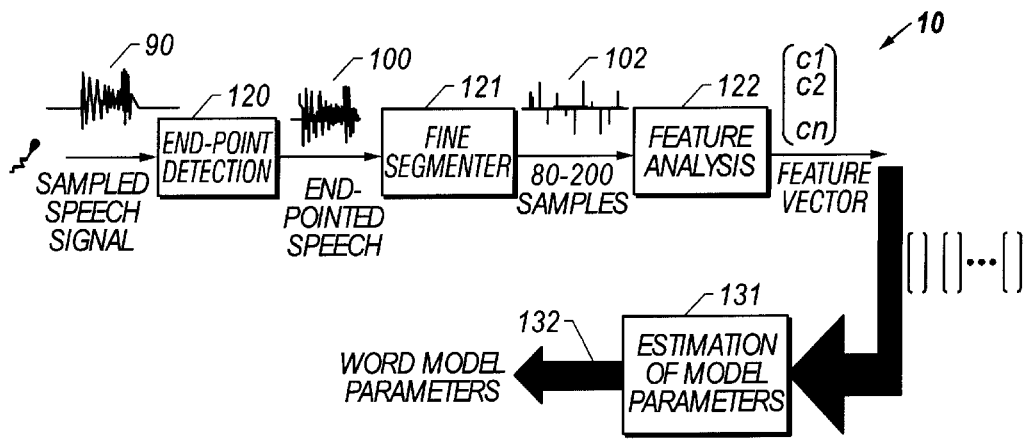
FIG. 4 is a flow diagram that illustrates the training process in an SD speech recognition system.
Figure 5:
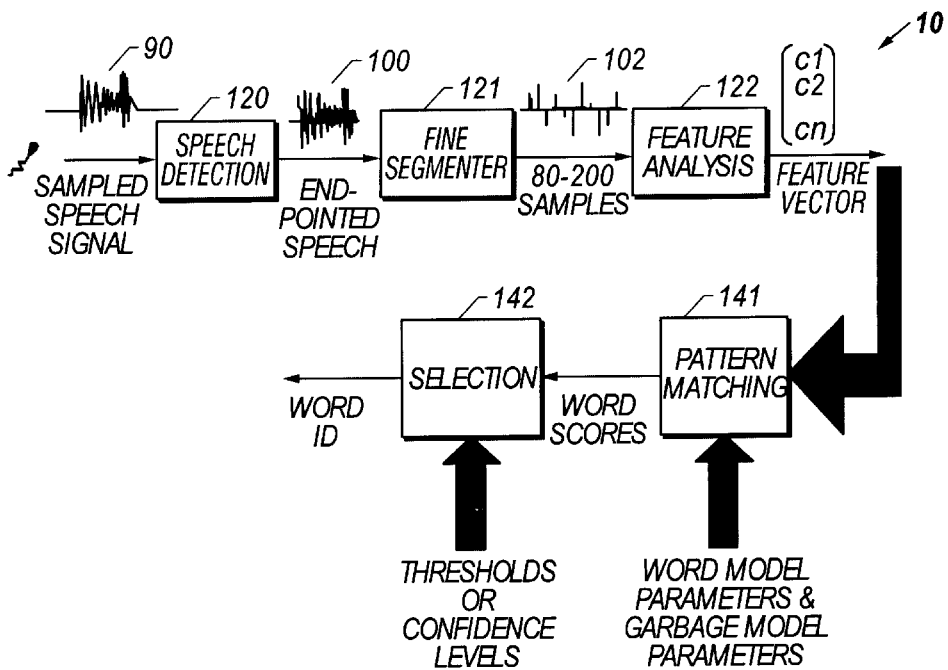
FIG. 5 is a flow diagram that illustrates the recognition process in the SD speech recognition system

FIGS. 4 and 5 are flow diagrams that respectively illustrate the training and recognition processes. As shown in FIGS. 4 and 5, the basic components of a speech recognition system 10 include front-end or pre-processing elements which in this case, includes an end-point detection block 120 that receives a sampled speech signal 90 from a microphone (not numbered) and converts it into a token 100 and a segmenter 121 that segments the token 100 into frames or segments 102), a feature extraction block 122, training elements (e.g. an estimation block 131 as shown in FIG. 4), and recognition elements (e.g. a pattern matching block 141 and a selection block 142 as shown in FIG. 5). The pre-processing and feature extraction are the common denominators for both the training process and the recognition process.

Figure 5A:
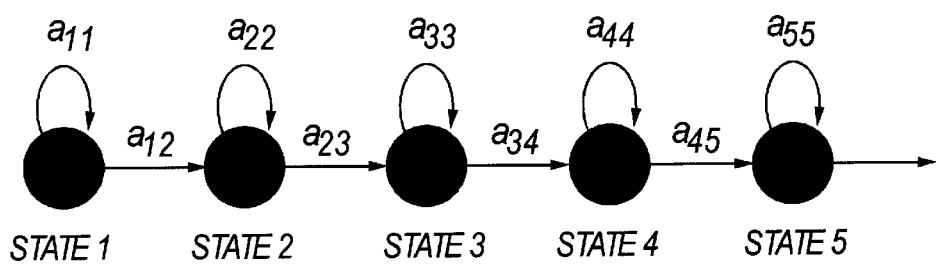
FIG. 5A is a state diagram related to a Hidden Markov process wherein each state approximately represents a single sound unit or cluster of sound units in a vocabulary word.

FIG. 4 shows the flow specific to the training process. Here, the entire set of feature vectors $$\begin{bmatrix} c1 \\ c2 \\ \vdots \\ cn \end{bmatrix} \begin{bmatrix} c1 \\ c2 \\ \vdots \\ cn \end{bmatrix} \cdots \begin{bmatrix} c1 \\ c2 \\ \vdots \\ cn \end{bmatrix}$$

corresponding to all of the frames in the training token 100 must be available before starting parameter estimation in the estimation block 131. Hence, both the beginning and the end points of the speech signal 90 need to be detected and all the frames 102 between those points need to be processed before starting the parameter estimation 131. After the feature extraction, each vocabulary word is represented by a model, as shown in FIG. 5A, where each state of the Hidden Markov process approximately represents a single sound unit or cluster of sound units in the vocabulary word. The model is completely described by the number of states N, the transition probabilities, $a_{ij}$ (from state i to state j) and the observation probabilities $b_{ti}$ for each state i at any time instant t. The training process is equivalent to estimating these parameters for each vocabulary word from the training data.

FIG. 5 shows the flow specific to the recognition process. Here, the matching/scoring starts as soon as speech 90 is detected and will continue till the end of speech is detected. Hence, each frame 102 of speech is processed as it is being recorded. Once the feature vector $$\begin{bmatrix} c1 \\ c2 \\ \vdots \\ cn \end{bmatrix}$$

is computed, the recognition process accomplished in the pattern matching block 141 is equivalent to computing the likelihood score (logarithm of the probability of observing the feature vector for the test token, given a HMM model for a vocabulary word). Once the end of speech is detected, the scoring process stops. The accumulated score up to the last frame is considered as the word score. Then the word with the best likelihood score is declared by the selection block 142 as the recognized word.

If a garbage model is not available to the pattern matching block 141 during the matching stage, and if no score thresholds are provided to the selection block 142 during the selection process, each spoken utterance will be matched with one of the vocabulary words whether it is a valid vocabulary word or not. This may annoy the user. It is crucial, therefore, to add rejection capability to the system.

As mentioned earlier, however, the known rejection methods used in SI speech recognition systems are not well suited for an SD system that only has limited training data. There is a need, therefore, for a rejection criteria that operates effectively with only limited SD training data. This invention provides a unique method of creating one or more garbage models from the limited SD training data and a new rejection method that uniquely combines garbage model matching with thresholds or confidence measures. In addition, the preferred method of generating the garbage model is well-suited for use in a limited resource device which often goes hand in hand with the use of an SD system.

FIG. 5 illustrates the recognition process in an SD system according to the present invention. Significantly, as shown, garbage model parameters are applied to a pattern matching block 141 in combination with thresholds or confidence levels that are applied to a selection block 142. What remains to be discussed are how the garbage model parameters are derived, how the absolute score thresholds or confidence levels are derived, and how they are applied during recognition.

The New Rejection Methodology

Although a simple threshold may be used, the preferred rejection criterion combines confidence measures with a garbage model. The presently preferred confidence measure is a function of the distance between the highest score and the next K-best scores where K is 1, 2 or 3. For example, where K=1, If (best_score−second_best_score)<75% of best_score
then
    Reject the utterance
else
    Declare the recognized word The threshold percentage applied to the confidence level may, of course, be other than 75%

The Speaker-Specific Garbage Model

The preferred speech recognition system uses a speaker-specific garbage model in addition to the confidence measure, such as that set forth above, in order to increase the rejection rate without affecting the false rejection rate. For this purpose, the system 10 uniquely derives the speaker-specific garbage model from the speech collected during the training phase. In particular, as suggested by FIG. 6, the system takes the vocabulary words collected during training and scambles the corresponding frames or segments 102 to create a new collage of sounds.

Figure 6:
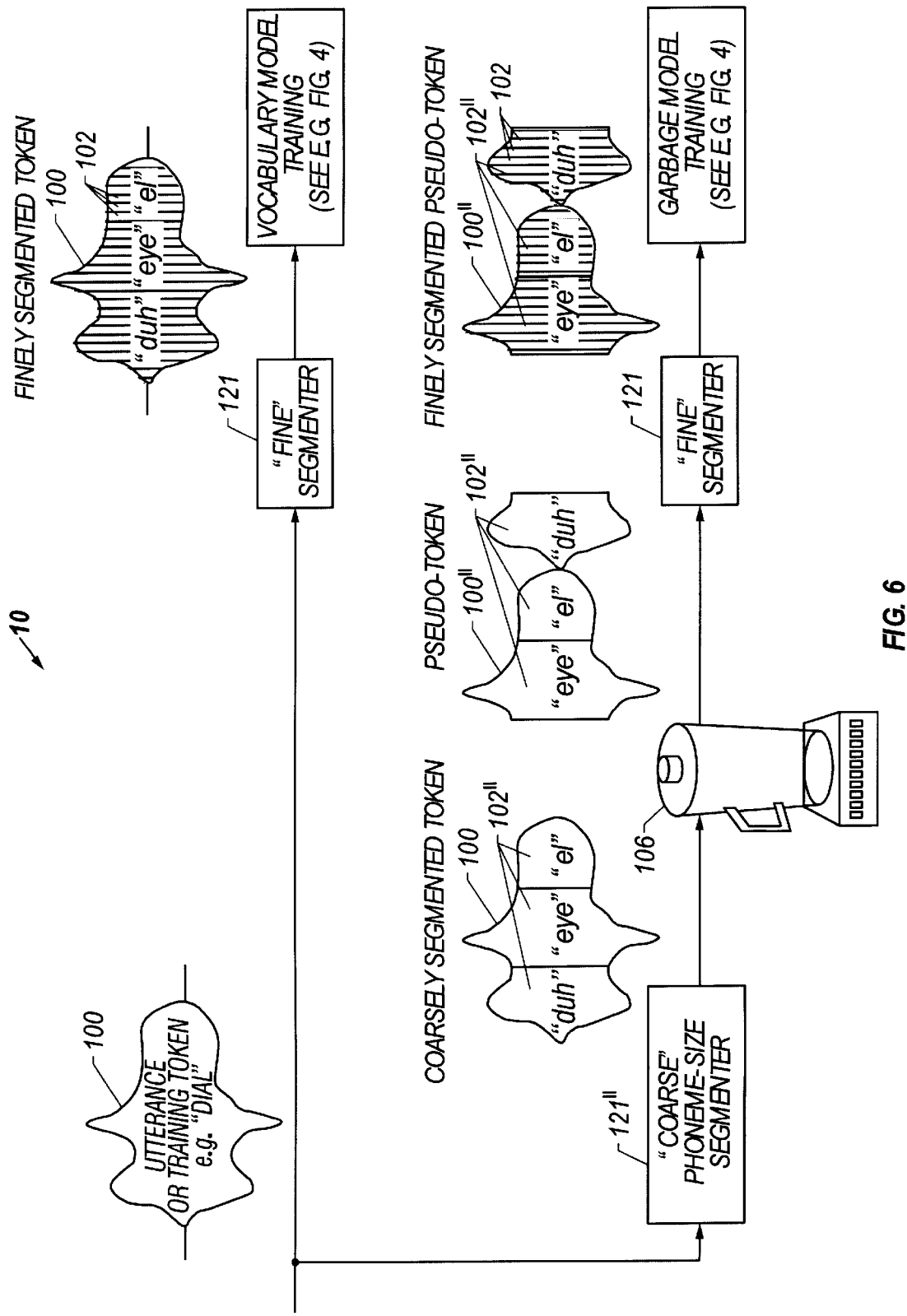
FIG. 6 is a figurative depiction of a method of forming a garbage model in an SD speech recognition system according to the present invention that segments a a training token 100 into training segments 102 to form a vocabulary model in a normal manner, and in addition, segments the training token into scramble segments 102* (preferably of length approximating the average duration of a vowel sound, e.g. ≈50 msecs), rearranging the scramble segments 102* or frames to form a pseudo-token 100*, and then segmenting the newly formed pseudo-token 100* into training segments 102 to form a garbage model.

FIG. 6 is a simplified and highly figurative flow diagram of a an SD speech recognition system 10 according to the present invention that performs both vocabulary model training and garbage model training using a speaker-specific utterance or training token 100. As shown, the system 10 forms a vocabulary model in an ordinary manner by using a "fine" segmenter 121 to divide the utterance 100 into a plurality of ordinary training segments or training frames 102. In addition, however, the system 10 applies a segmenter 121* to segment the same utterance or training token into a plurality of scramble segments or frames 102*. The segmenter 121* is preferably "coarse" relative to the first segmenter 121 in that the scramble segments 102* are preferably of sufficient duration to contain the information corresponding to a single phoneme. The presently preferred duration for the scramble segments 102* is 50 msecs as that is the approximate average length of a vowel sound. As figuratively suggested by the "blender" 106, however, the scamble segments 102* of the training word 100 are then uniquely mixed, interchanged, or otherwise modified, to form a non-speech pseudo-token 100*. The non-speech pseudo-token 100* is then segmented using a "fine" segmenter 121 which divides the pseudo-token 100* into training segments 102 that are used to form a garbage model. As noted in FIG. 6, the segmenter 121 and training processes may be as shown in FIG. 4. It should also be noted that while FIG. 6 shows several discrete segmenters, all of the segmenters, including the "coarse" segmenter 121*, are preferably implemented by using some or all of the same hardware and/or firmware.

FIG. 6 uses "DIAL" as a hypothetical training word 100 and correlates the segments 102 with three phonemes "duh", "eye" and "el." In reality, of course, the training token 100 is divided into segments of very short duration, e.g. 10–20 msecs, to form dozens, hundreds or even thousands of training segments 102. The scramble segments 102*, however, are preferably longer in duration such that they will more closely correlate to audibly discrete components of speech as shown in FIG. 6.

The vocabulary model and garbage model may be formed according to any desired speech recognition models known in the art such as, for example, the Hidden Markov Model approach shown in FIG. 4. The detailed operations of forming the models are omitted at this point because they are well known in the art and such details are not necessary for an understanding of this invention.

The pseudo-token 100* of re-sequenced scramble frames 102* may be used as training material to produce a reliable garbage model because it keeps the speaker-specific characteristics contained in the original training token 100, without keeping any of the acoustic characteristics of the vocabulary word. Many sets of new sequences 100* can be prepared from a single training token 100, or from several distinct training tokens 100, by ordering and/or combining the frames 102 from such token 100 or tokens 100 in different ways. Repeating this process of scrambling, as much training material as needed can be created. Since the acoustic properties of the new training material and the original training token are different, the garbage model can be created even when only one training token for only one word is available. The garbage model can be updated as more training tokens are available from the speaker.

Figure 8:
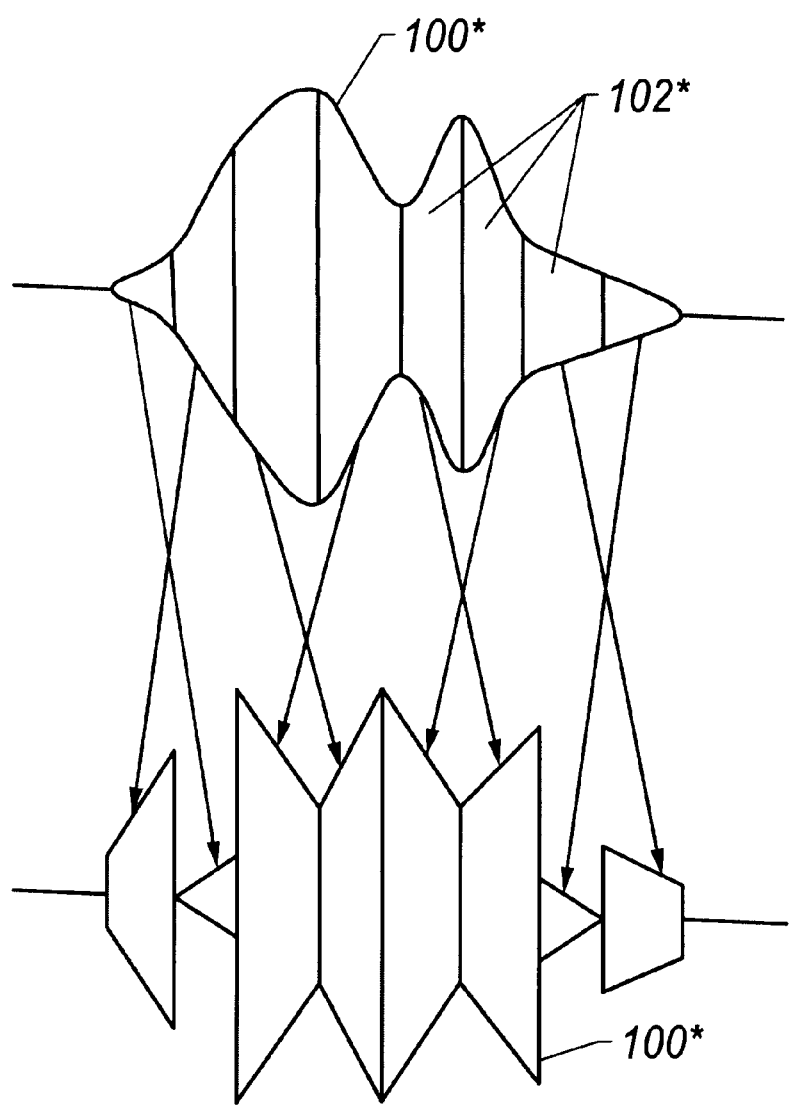
FIG. 8 illustrates a first preferred method of "frame level segmentation" wherein a training token 100 is divided into scramble segments 102* which are then reordered by swapping each segment with a neighboring segment to form a new pseudo-token or "garbage" token 100* for training a garbage model.
Figure 9:
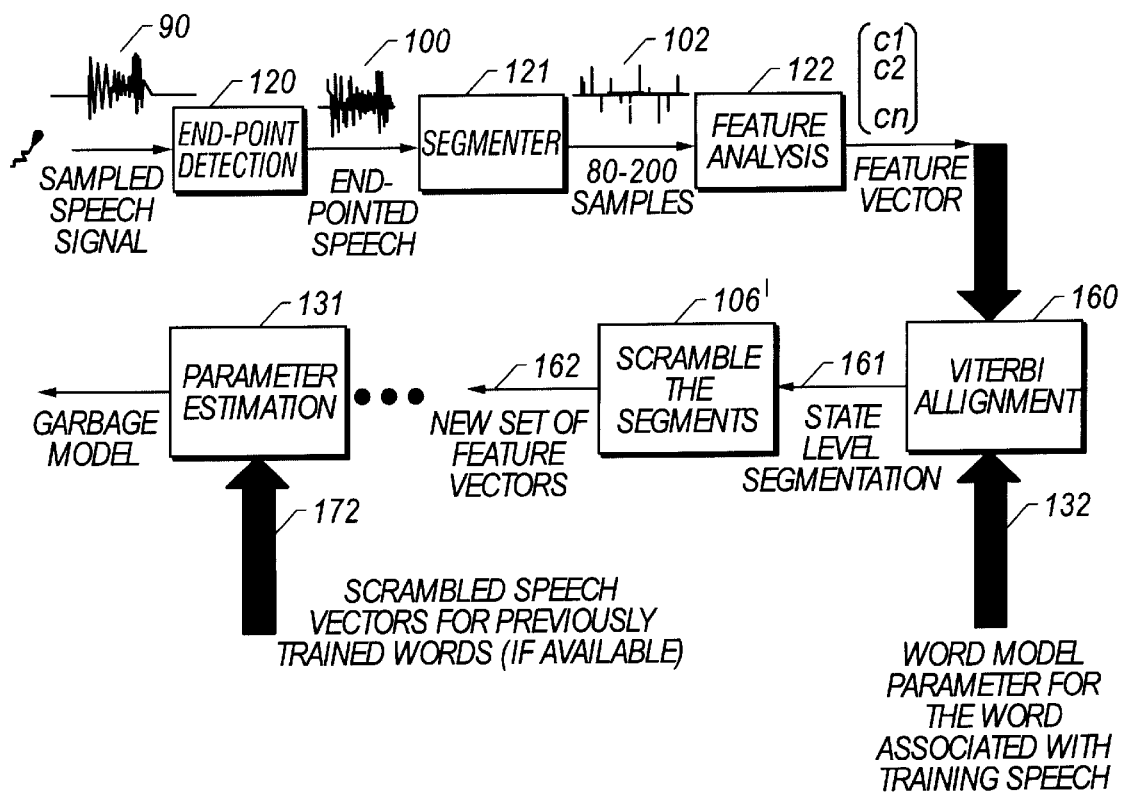
FIG. 9 is a flow diagram that illustrates a second preferred method of "state level segmentation" in forming a garbage model for use in the SD speech recognition system.

The system can perform the scrambling or rearranging discussed above at least two different ways, using frame level segmentation (FIGS. 6, 7 and 8) or state level segmentation (FIG. 9). In either case, the amount of training material created and the selection of the small set of scrambled sequences from the large number of possible sequences is determined based on the environment and the computing/memory resources available for a particular application. These two approaches are discussed below.

Frame Level Segmentation

Figure 7:
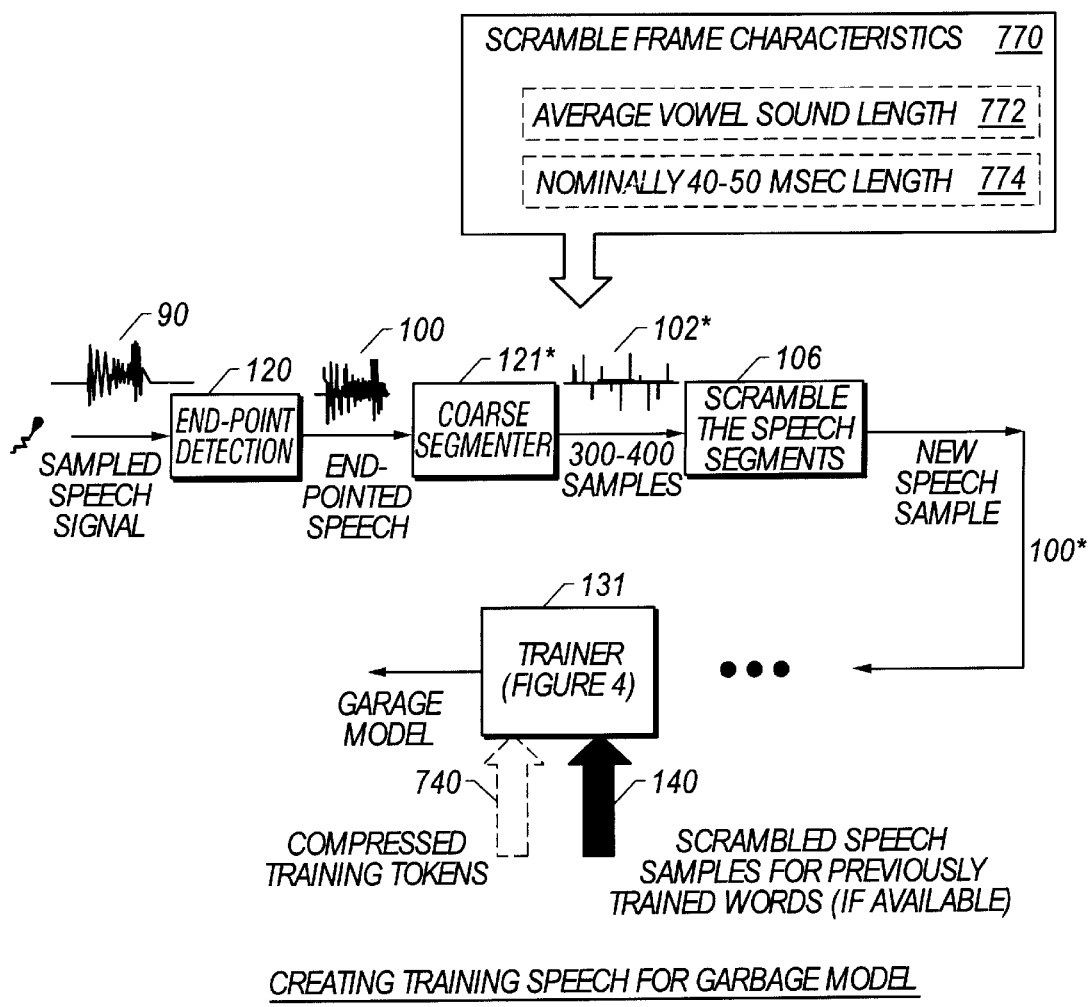
FIG. 7 is a flow diagram that illustrates a first preferred method of "frame level segmentation" in forming a garbage model for use in the SD speech recognition system.

FIG. 7 shows the flow specific to frame level segmentation. Here, the speech 90 is segmented by a coarse segmenter 121* into scramble frames 102* of arbitrary length. The scramble frames 102* themselves contain certain scramble frame characteristics 770. For example, in certain embodiments of the invention, one of the scramble frame characteristics 770 is that each of the scramble frames 102* has an average vowel sound length 772, as shown by a dotted line. In alternative embodiments, each of the scramble frames 102* has a nominally 40–50 msec length 774, as shown by a dotted line. In even another embodiment, the scramble frames 102* are shown as being 300–400 8 kHz samples. Then, these scramble frames 102* are ordered in several different ways by a scramble block 106 to form a set of one or more new pseudo tokens 100*. The pseudo-token(s) 100* are then used in the training process as shown in FIG. 4 to build a model for out-of-vocabulary speech. As suggested by arrow 140, any scrambled speech samples or pseudo-tokens 100* available from previously trained words are preferably included in the garbage model training process.

In the current preferred implementation, 50 msec. segments 102* are used in deriving two pseudo-tokens 100* from one original training token 100. In the first sample 100*, each scramble frame 102* is simply switched with its neighboring frame 102* as shown in FIG. 8. The second pseudo-token 100* (not shown), however, is prepared by switching every '$i^{th}$' 102* with a '$(T-i)^{th}$' frame 102* where 'T' is the total number of scramble frames 102* in the utterance.

One advantage of this approach is that even the training tokens in compressed form can be used to build a garbage model. For example, as shown in an alternative embodiment of the invention by the arrow 740 in the FIG. 7, shown as a dotted line, compressed training tokens are capable of being used to build the garbage model. The creation of a garbage model, therefore, can be performed off-line. Updating the garbage model to accommodate new training material is easier and usually results in a more robust garbage model. Our experiments have shown that the performance degradation by using compressed speech is almost unnoticeable. Because of the limitations on available resources, compression is a requirement for some applications such as 'Voice Dialing' in a cellular phone.

State Level Segmentation

FIG. 9 shows the flow specific to state level segmentation. Here, the feature vectors are computed by the feature analyzer 122 for each frame (of length 10–20 msecs). Then, at 160, the utterance is matched with itself by using previously computed word model 132. The matching process 160, which is also known as "Viterbi scoring," results in a state segmentation 161. In other words, each frame of the word is assigned to an HMM state in an optimal way. Now, the scrambling 106' is done, but at a state level. The order of the states is modified while keeping all the frames in a state together. This rearrangement 106' is more intuitive and more accurate because each state in an HMM is supposed to represent an acoustic event or acoustic unit.

The reordered states sequences 162 correspond to a new pseudo-token training sample 100*. Since the feature extraction and state segmentation is already done, however, the new state sequences 162 are used directly in the parameter estimation 131 as shown in FIG. 7. Any of the scrambled state sequences 172 available from previously trained words are also preferably used in the garbage model parameter estimation.

In the currently preferred implementation of state level segmentation, only one new training sample 100* (scambled state sequence) is derived from each utterance. The new sequence, for example, may be obtained by switching every '$i^{th}$' state with '$(N-i)^{th}$' state where 'N' is the total number of states in the utterance. Other rearranging methodologies, of course, are possible. The out-of-vocabulary model will become more robust as more words are introduced into the vocabulary.

I claim:

1. A method of identifying speech comprising the steps of:
   receiving a training token corresponding to a vocabulary word;
   generating a vocabulary model based on the training token;
   modifying the training token to form a pseudo-token;
   generating a garbage model based on the pseudo-token;
   comparing a speech signal to be identified to the vocabulary model;
   comparing the speech signal to be identified to the garbage model; and
   deciding if the speech signal to be identified is the vocabulary word based on both of the comparing steps.

2. The method of claim 1 wherein the modifying step comprising the steps of:
   segmenting the training token into a plurality of frames; and
   rearranging the plurality of frames to form the pseudo-token.

3. The method of claim 2 wherein the rearranging step operates by swapping successive pairs of adjacent frames.

4. The method of claim 1 wherein the step of comparing the speech signal to the vocabulary model generates a word score and wherein the deciding step further comprises comparing the word score to an absolute threshold.

5. The method of claim 1 wherein the step of comparing the speech signal to the vocabulary model generates a word score and wherein the deciding step further comprises comparing the word score to at least one other word score from a word model corresponding to at least one other vocabulary word to generate a confidence measure.

6. The method of claim 1 wherein the training token is received in a compressed form and is decoded before proceeding with the other steps.

7. A method of identifying speech comprising the steps of:
   receiving a training token corresponding to a vocabulary word;
   generating a vocabulary model based on the training token;
   modifying the vocabulary model to form a garbage model;
   comparing a speech signal to be identified to the vocabulary model;
   comparing the speech signal to be identified to the garbage model; and
   deciding if the speech signal to be identified is the vocabulary word based on both of the comparing steps.

8. The method of claim 7 wherein the vocabulary model is generated as a Hidden Markov Model having a plurality of states and wherein the modifying step comprises the steps of:
   rearranging the states of the Hidden Markov Model to form a modified Hidden Markov Model; and
   using the modified Hidden Markov Model as a garbage model.

9. The method of claim 8 wherein the rearranging step operates by swapping successive pairs of adjacent states of the Hidden Markov Model.

10. The method of claim 7 wherein the step of comparing the speech signal to the vocabulary model generates a word score and wherein the deciding step further comprises comparing the word score to an absolute threshold.

11. The method of claim 7 wherein the step of comparing the speech signal to the vocabulary model generates a word score and wherein the deciding step further comprises comparing the word score to at least one other word score from a word model corresponding to at least one other vocabulary word to generate a confidence measure.

12. The method of claim 7 wherein the training token is received in a compressed form and is decoded before proceeding with the other steps.

13. A method to generate a garbage model, the method comprising:
    segmenting a training token into a plurality of frames, the training token being representative of a speech signal;
    rearranging the plurality of frames to form a pseudo-token, the training token being a rearranged representation of a speech signal; and
    using the pseudo-token to create the garbage model.

14. The method of claim 13 wherein the rearranging step comprises swapping successive pairs of adjacent frames of the plurality of frames.

15. The method of claim 13 wherein the plurality of frames are each about the length of an average vowel sound.

16. The method of claim 13 wherein the plurality of frames are each about 40 to 50 msecs in length.

17. A method to generate a garbage model for use in a speaker dependent speech recognition system to perform speech recognition of an uttered speech signal, the method to generate the garbage model comprising:
    converting a training token, representative of a speech signal, into a plurality of states in a Hidden Markov Model, each state being representative of at least one of an acoustic event and an acoustic unit;
    using the Hidden Markov Model as a vocabulary model;
    rearranging the plurality of states of the Hidden Markov Model to form a modified Hidden Markov Model; and
    using the modified Hidden Markov Model as a garbage model.

18. The method of claim 17 wherein the rearranging step comprises swapping successive pairs of adjacent states of the Hidden Markov Model.

* * * * *